(12) United States Patent
Stefanon (10) Patent No.: US 8,560,209 B2
(45) Date of Patent: Oct. 15, 2013

(54) METHOD AND SYSTEM FOR DELIVERING ENRICHMENT TO AN ENGINE

(75) Inventor: Heraldo F. Stefanon, Huntington Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 683 days.

(21) Appl. No.: 12/821,108

(22) Filed: Jun. 22, 2010

(65) Prior Publication Data
US 2011/0313638 A1  Dec. 22, 2011

(51) Int. Cl.
*F02D 41/04* (2006.01)

(52) U.S. Cl.
USPC ...... 701/104; 123/491; 123/492; 123/179.16; 123/676; 701/109; 701/113

(58) Field of Classification Search
USPC ............ 701/103, 104, 109, 113; 123/179.16, 123/179.17, 676, 685, 443, 491, 492
See application file for complete search history.

(56) References Cited

U.S. PATENT DOCUMENTS

| | | | | |
|---|---|---|---|---|
| 3,971,354 A | * | 7/1976 | Luchaco et al. | ......... 123/179.15 |
| 3,991,726 A | * | 11/1976 | Kawai et al. | .................... 123/491 |
| 4,114,570 A | * | 9/1978 | Marchak et al. | ............... 123/491 |
| 4,239,022 A | * | 12/1980 | Drews et al. | .................... 123/491 |
| 4,245,317 A | * | 1/1981 | Marchak | ........................ 701/113 |
| 4,246,639 A | * | 1/1981 | Carp et al. | ..................... 701/113 |
| 4,437,445 A | * | 3/1984 | Takahashi et al. | ............. 123/491 |
| 5,016,596 A | | 5/1991 | Fujimura et al. | |
| 5,142,479 A | * | 8/1992 | Poirier et al. | .................. 701/113 |
| 5,372,101 A | * | 12/1994 | Hoshiba et al. | ........... 123/179.15 |
| 5,413,078 A | | 5/1995 | Mitsunaga et al. | |
| 5,570,575 A | | 11/1996 | Sato et al. | |
| 5,638,795 A | | 6/1997 | Hara et al. | |
| 5,992,144 A | | 11/1999 | Takanohashi et al. | |
| 6,116,023 A | | 9/2000 | Ishizuka et al. | |
| 6,116,208 A | | 9/2000 | Nishimura et al. | |
| 6,314,725 B1 | * | 11/2001 | Wakui | ............................. 60/295 |
| 6,578,557 B1 | | 6/2003 | Messick | |
| 6,588,409 B2 | | 7/2003 | Maloney et al. | |
| 6,594,988 B2 | | 7/2003 | Takubo et al. | |
| 7,293,406 B2 | | 11/2007 | Lewis et al. | |
| 8,166,942 B2 | * | 5/2012 | Uplap et al. | ............. 123/179.16 |

FOREIGN PATENT DOCUMENTS

JP  56135737  10/1981

* cited by examiner

*Primary Examiner* — Erick Solis
(74) *Attorney, Agent, or Firm* — Snell & Wilmer LLP (57) ABSTRACT

The present invention includes an automobile including an enrichment delivery system. The enrichment delivery system includes an engine, a catalytic converter, multiple sensors, a memory, and a control unit. The engine includes an enrichment delivery unit, which delivers base fuel and enrichment to the engine. The engine generates an output which can be received by the catalytic converter. Reactions occur within the catalytic converter, and are outputted by the catalytic converter. The sensors detect an air-fuel ratio from the output of the engine, and the output of a catalytic converter. The sensors detect temperature data for the catalytic converter. The memory stores an enrichment curve indicating that an amount of enrichment supplied to the engine should be gradually increased based on the enrichment curve until a target enrichment amount is reached, or a predetermined target enrichment time is reached.

20 Claims, 5 Drawing Sheets

METHOD AND SYSTEM FOR DELIVERING ENRICHMENT TO AN ENGINE

BACKGROUND

1. Field

The present invention relates to a method and system for delivering enrichment to an engine, and more particularly, to a method and system for delivering enrichment to an engine for improving an efficiency of an automobile, and reducing emissions of the automobile.

2. Description of the Related Art

Conventional enrichment delivery units deliver enrichment to an engine in a binary manner during an initial delivery of the enrichment. In the binary delivery, either the enrichment delivery unit initially delivers enrichment to the engine or it does not. However, this binary delivery of enrichment can enrich the air to fuel mixture ratio for an output of the engine by too much. Too much enrichment in the air to fuel mixture ratio of the output of the engine can overwhelm the catalytic converter. This can lead to higher emissions from the automobile. Furthermore, the binary delivery of the enrichment can consume a large amount of fuel, which can reduce an efficiency of the automobile.

Thus, there is a need for a method and system for delivering enrichment to an engine for improving an efficiency of an automobile, and reducing emissions of the automobile.

SUMMARY

The present invention is a method and system for activation of the initial delivery of enrichment to an engine for improving an efficiency of an automobile, and reducing emissions of the automobile. In one embodiment, the present invention can include an automobile including an enrichment delivery system. The enrichment delivery system can include an engine, a catalytic converter, multiple sensors, a memory, and a control unit. The engine can include an enrichment delivery unit, which delivers base fuel and enrichment to the engine.

The engine generates an output which can be received by the catalytic converter. Reactions occur within the catalytic converter and the result of the reactions is outputted by the catalytic converter. The sensors can detect an air-fuel ratio from the output of the engine, and an output of a catalytic converter. The sensors can also detect temperature data for the catalytic converter. The memory stores an enrichment map including an enrichment curve. The enrichment curve indicates an amount of enrichment to be initially supplied to the engine by the enrichment delivery unit for a given time period. The enrichment curve can indicate, for example, that an amount of enrichment supplied to the engine should be gradually increased until a target enrichment amount is reached.

This can reduce a likelihood that the air to fuel mixture from the output of the engine will suddenly and drastically be enriched, and overwhelm the catalytic converter while increasing the emissions of the automobile. Furthermore, the gradual increase in the amount of enrichment supplied to the engine can reduce an amount of fuel consumed by the automobile, resulting in a more efficient operation of the automobile.

The control unit controls the delivery of enrichment by the enrichment delivery unit based on the enrichment map. The control unit can also analyze the air-fuel ratio and the temperature data to modify the enrichment map, such as a slope of the enrichment curve, or the target enrichment amount.

In one embodiment, the present invention is an enrichment delivery system including an enrichment delivery unit configured to initially deliver enrichment to an engine, a memory configured to store an enrichment map including an enrichment curve, and a control unit configured to control, based on the enrichment curve, an amount of enrichment initially delivered to the engine from the enrichment delivery unit.

In another embodiment, the present invention is an automobile including an engine configured to receive fuel and enrichment, and generate an output, a catalytic converter receiving the output of the engine, an enrichment delivery unit configured to deliver the enrichment to the engine, a memory configured to store an enrichment map including an enrichment curve, wherein the enrichment curve indicates a gradual increase in an amount of initial enrichment to be delivered to the engine until the amount of enrichment reaches a target enrichment amount or a predetermined target enrichment time has been reached, and a control unit configured to control, based on the enrichment curve, an amount of enrichment initially delivered to the engine from the enrichment delivery unit.

In another embodiment, the present invention is a method for initially delivering enrichment to an engine including storing an enrichment map including an enrichment curve, controlling, based on the enrichment curve, an amount of enrichment initially delivered to the engine from an enrichment delivery unit, and delivering, using the enrichment delivery unit, the amount of enrichment to the engine indicated by the enrichment curve.

BRIEF DESCRIPTION OF THE DRAWINGS

The features, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
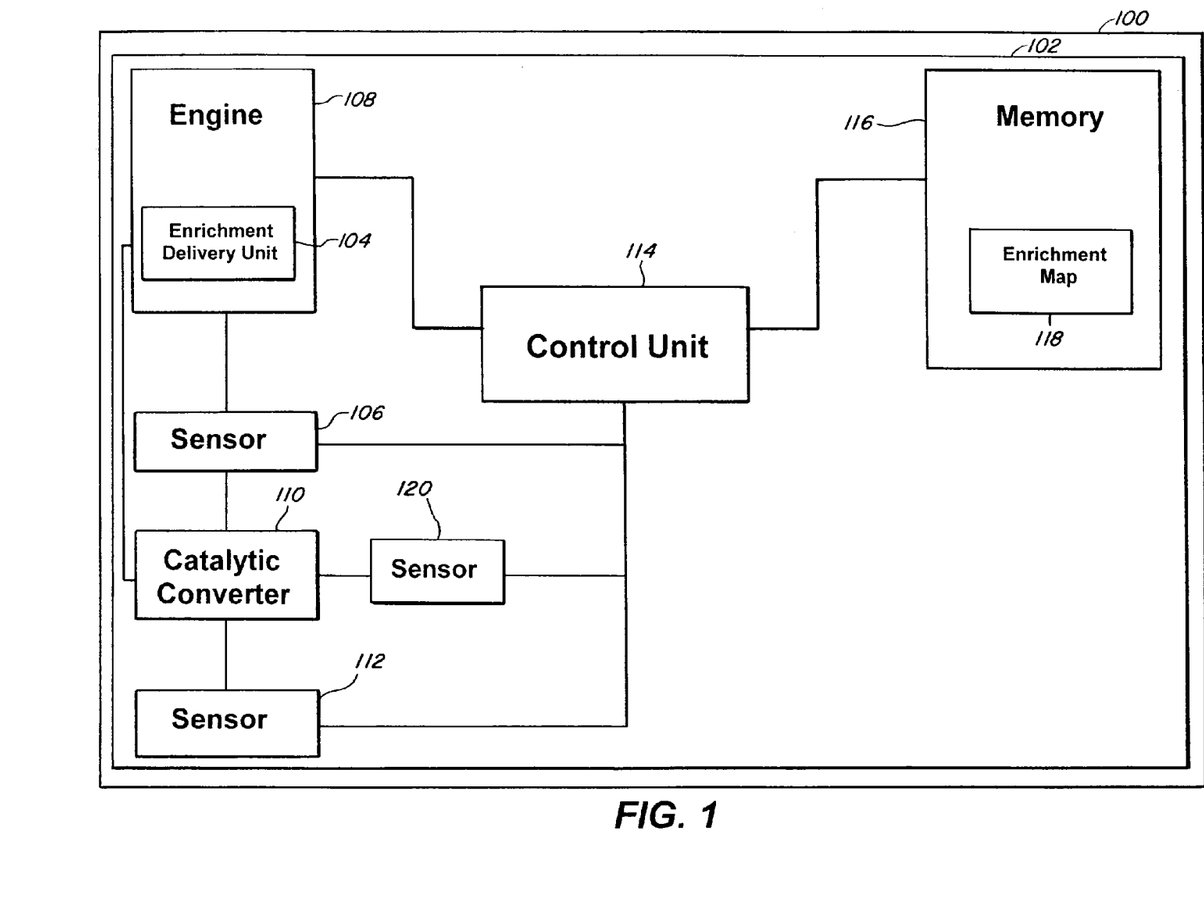
FIG. 1 is a box diagram of an automobile including an enrichment delivery system according to an embodiment of the present invention.

As seen in FIG. 1, the present invention includes an automobile 100 including an enrichment delivery system 102. The automobile 100 can be, for example, a car with an internal combustion engine, a hybrid car, a car using fuel, or any other transportation device which uses fuel. The enrichment delivery system 102 can include, for example, a sensor 106, an engine 108, a catalytic converter 110, a sensor 112, a control unit 114, a memory 116, and/or a sensor 120.

The engine 108 is connected to a control unit 114 and/or a sensor 106. The engine 108 can be, for example, an internal combustion engine, or any other type of engine that consumes fuel. The engine 108 can include, for example, an enrichment delivery unit 104. The enrichment delivery unit 104 can be, for example, one or more fuel injectors, or any other type of device which can supply and/or regulate the delivery of base fuel and enrichment to the engine 108.

The base fuel is a normal amount of fuel supplied to the engine 108, which can be consumed to move the automobile 100. The enrichment is an additional amount of fuel that is supplied on top of the base fuel which serves to increase the output of the engine 108, reducing a ratio of air to fuel in the output of the engine 108, controlling a temperature of the engine 108, and/or protecting the catalytic converter 110. The amount of enrichment supplied to the engine 108 by the enrichment delivery unit 104 can be controlled, for example, by the control unit 114.

Figure 2:
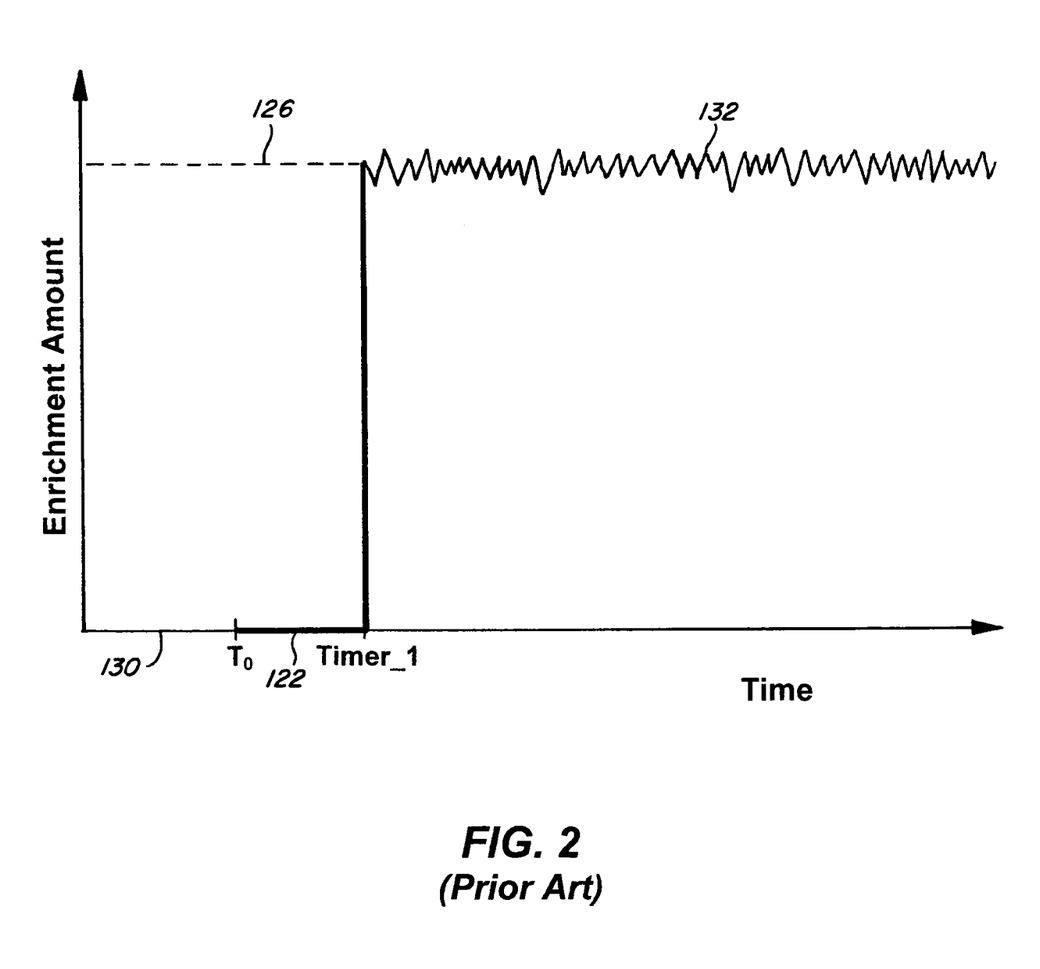
FIG. 2 is a graph depicting a conventional delivery of enrichment to an engine.

This can be seen, for example in FIG. 2. A conventional delivery of enrichment is indicated, for example, by a line 132. A target enrichment amount is indicated by line 126 and a target base fuel amount is indicated by line 130. Before time T0, the enrichment delivery unit 104 delivers no enrichment, and only delivers the base fuel to the engine 108 until the target base fuel amount is reached at time T0. After time T0, the enrichment delivery unit 104 delivers the base fuel, as indicated by line 122, at the target base fuel amount. No enrichment is delivered between the time T0 and the time Timer_1. That is, there can be a delay between when the enrichment delivery unit 104 is delivering the base fuel at the target base fuel amount and the commencement of the initial delivery of the enrichment.

However, at time Timer_1, the enrichment delivery unit 104 delivers the enrichment, as indicated by the line 132, instantaneously or substantially instantaneously at the target enrichment amount, indicated by the line 126. This delivery is generally in a binary manner with the enrichment delivery unit 104 delivering enrichment to an engine or not delivering enrichment to the engine. After time Timer_2, the amount of enrichment delivered to the engine 108 can vary based on the operational conditions of the engine 108 as seen by the jagged nature of the line 132.

The sensor 106 is connected to the engine 108 and/or the catalytic converter 110. The sensor 106 can be, for example, an air-fuel sensor. The sensor 106 can receive an output of the engine 108 and detect, for example, an air-fuel ratio (also can be referred to as an air-to-fuel ratio) for the output of the engine 108. The air-fuel ratio for the output of the engine 108 can indicate, for example, an air-to-fuel mixture ratio of the output of the engine 108. A large air-to-fuel mixture ratio means that there is a large amount of air relative to the amount of fuel. A small air-to-fuel mixture ratio means that there is a small amount of air relative to the amount of fuel. Enriching the air-to-fuel mixture ratio increases the amount of fuel relative to the amount of air. Leaning out the air-to-fuel mixture ratio decreases the amount of fuel relative to the amount of air.

The catalytic converter 110 is connected to the sensor 106, the engine 108, the sensor 112, and/or the sensor 120. The catalytic converter 110 can receive the output of the engine 108 from the sensor 106. Optionally, the catalytic converter 110 can also be connected directly to the engine 110 and partially or completely receive the output of the engine 108 directly from the engine 108. Reactions occur in the catalytic converter 110 to cleanse the output of the engine 108, and the result of the reactions is output from the catalytic converter 110.

The sensor 112 is connected to the catalytic converter 110 and/or the control unit 114. The sensor 112 can be, for example, an air-fuel sensor. The sensor 112 can receive an output of the catalytic converter 110 and detect, for example, air-fuel ratio for the output of the catalytic converter 110. The air-fuel ratio for the output of the catalytic converter 110 can indicate, for example, an air to fuel mixture ratio of the output of the catalytic converter 110. A large air to fuel mixture ratio means that there is a large amount of air relative to the amount of fuel. A small air to fuel mixture ratio means that there is a small amount of air relative to the amount of fuel.

The sensor 120 is connected to the catalytic converter 110 and/or the control unit 114. The sensor 120 can be, for example, a temperature sensor detecting temperature data. The temperature data can indicate, for example, a temperature of the catalytic converter 110 and/or a temperature of the reactions occurring within the catalytic converter 110.

The memory 116 is connected to the control unit 114. The memory 116 stores, for example, an enrichment map 118. In one embodiment, the enrichment map 118 indicates an amount of enrichment delivered by the enrichment delivery unit 104 to the engine 104. The enrichment map 118 can be seen, for example in FIG. 3. The enrichment map includes, for example, an enrichment curve 134. The enrichment curve 134 indicates an initial amount of enrichment that the enrichment delivery unit 104 should deliver to the engine 108. The target enrichment amount is indicated by line 126 and a target base fuel amount is indicated by line 130.

Figure 3:
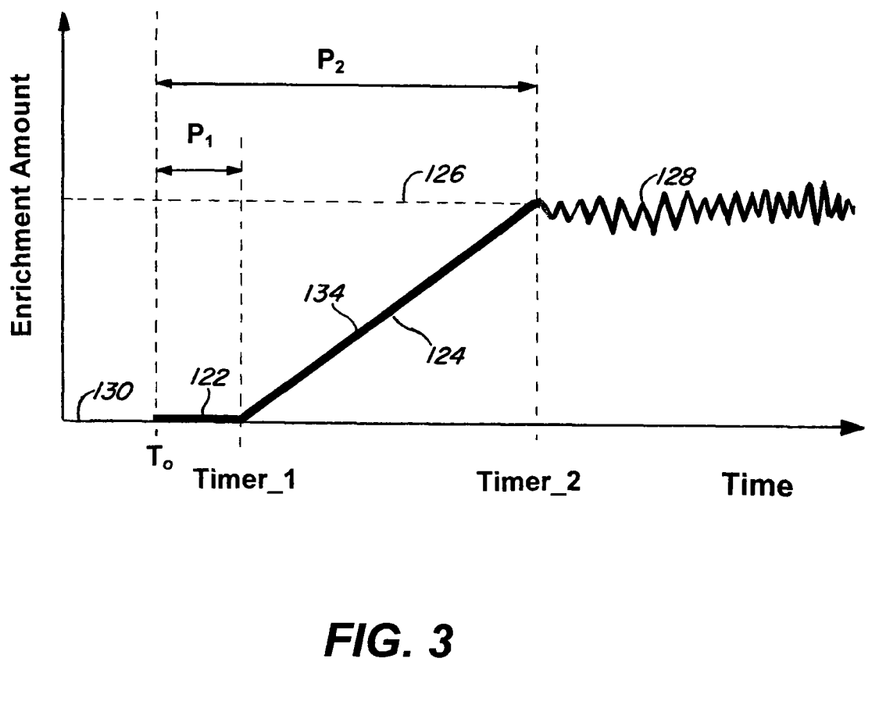
FIG. 3 is an enrichment graph including an enrichment curve according to an embodiment of the present invention.

Before time T0, the enrichment delivery unit 104 delivers no enrichment, and only delivers the base fuel to the engine 108 until the target base fuel amount is reached at time T0. After time T0, the enrichment delivery unit 104 delivers the base fuel, as indicated by line 122, at the target base fuel amount. No enrichment is delivered between the time T0 and the time Timer_1 as indicated by the period P1. That is, there can be a delay between when the enrichment delivery unit 104 is delivering the base fuel at the target base fuel amount and the commencement of the delivery of the enrichment. The amount of delay can be varied by the control unit 114 and can be extended, shortened, or eliminated. The delay can be varied, for example, based on the efficiency of the automobile 100.

However, at time Timer_1, the enrichment delivery unit 104 begins initially delivering the enrichment in a gradual manner, as indicated by a gradual enrichment curve 124. The enrichment delivery unit 104 gradually increases an amount of enrichment delivered to the engine 108 until a target enrichment amount is reached at time Timer_2, as indicated by the gradual enrichment curve 124. The enrichment delivery unit 104 can also gradually increase an amount of enrichment delivered to the engine 108 until a predetermined target enrichment time is reached. In one embodiment, the target enrichment time is, for example, the time Timer_2. When the target enrichment amount is reached at time Timer 2 and/or the predetermined target enrichment time is reached, the enrichment delivery unit 104 can deliver the target enrichment amount to the engine 108 as indicated by a line 128. After time Timer_2, the amount of enrichment delivered to the engine 108 can vary based on the operational conditions of the engine 108 as seen by the jagged nature of the line 128. Furthermore, the time period between when the enrichment delivery unit delivers the base fuel at the target base fuel amount and when the enrichment delivery unit 104 delivers the enrichment at the target enrichment amount is P2. The time period P2 can also be, for example, the time period between when the enrichment delivery unit delivers the base fuel at the target base fuel amount and when the target enrichment time Timer_2 is reached.

Although the gradual enrichment curve 124 appears as a line in FIG. 3, a portion or all of the gradual enrichment curve 124 can have any curved shape. Furthermore, a portion or all of the gradual enrichment curve 124 can be a series of steps. In addition, a portion of all of the gradual enrichment curve 124 can be concave or convex.

The control unit 114 is connected to the memory 116, the engine 108, the sensor 106, the sensor 112, and/or the sensor 120. The control unit 114 can reference the enrichment map 118 in the memory 116 and control the amount of enrichment delivered to the engine 108 by the enrichment delivery unit 104. For example, the control unit 114 can control the enrichment delivered by the enrichment delivery unit 104 according to the enrichment curve 134. Thus, instead of delivering the enrichment immediately at the time Timer_1 in a binary manner, as shown in FIG. 2, the control unit 114 can control the enrichment delivery unit 104 to deliver the enrichment gradually according to the enrichment curve 134, and more specifically, initially deliver enrichment gradually according to the gradual enrichment curve 124.

By gradually increasing the amount of enrichment delivered to the engine 108, less enrichment can be consumed, making the operation of the automobile 100 more efficient. In addition, the catalytic converter 110 will be better able to handle a gradual increase in enrichment when performing reactions to cleanse the output of the engine 108 as opposed to a sudden increase in the amount of enrichment in conventional systems. Thus, the gradual enrichment of the air to fuel mixture ratio of the output of the engine 108 can reduce a likelihood that the catalytic converter 110 will be overwhelmed by the output of the engine 108. This can reduce emissions in the output of the catalytic converter 110, and/or the automobile 100.

Furthermore, the gradual increase in the amount of enrichment delivered to the engine 108 may not damage the catalytic converter 110 since some enrichment will be delivered to the engine 108, enriching the air to fuel ratio of the output of the engine 108. Likewise, the time P2 is sufficiently short so that the catalytic converter 110 will not be damaged by a leaner air-fuel ratio.

In one embodiment, the control unit 114 can access the enrichment map 118 in the memory 116 and dynamically modify the enrichment map 118. For example, the control unit 114 can analyze the air-fuel ratio of the output of the engine 108, the air-fuel ratio of the output of the catalytic converter 110, and/or the temperature data to increase or decrease the target enrichment amount indicated by the line 126 (FIG. 3), the target enrichment time indicated by Timer_2, and/or to adjust a slope of the gradual enrichment curve 124 in the enrichment curve 134 (FIG. 3).

Thus, if the air-fuel ratio of the output of the engine 108 and/or the air-fuel ratio of the output of the catalytic converter 110 is lean enough that a temperature of the catalytic converter 110 may be damaged from the reactions occurring within the catalytic converter 110, the control unit 114 can modify the enrichment map 118 to increase the target enrichment amount indicated by the line 126, decrease the target enrichment time, and/or increase the slope of the gradual enrichment curve 124. This can reduce a likelihood of damage to the catalytic converter 110 by increasing the amount of enrichment supplied to the engine 108, enriching the air-to-fuel mixture ratio of the output of the engine 108.

However, if the air-fuel ratio of the output of the engine 108 and/or the air-fuel ratio of the output of the catalytic converter 110 is rich enough that a temperature of the catalytic converter 110 can be increased without damage to the catalytic converter 110 from the reactions occurring within the catalytic converter 110, the control unit 114 can modify the enrichment map 118 to decrease the target enrichment amount indicated by the line 126 and/or decrease the slope of the gradual enrichment curve 124. This can reduce an amount of enrichment used by the automobile 100 by allowing a reduced amount of enrichment to be delivered to the engine 108.

Likewise, if the temperature data indicates that a temperature of the catalytic converter 110 may be damaged from the reactions occurring within the catalytic converter 110, the control unit 114 can modify the enrichment map 118 to increase the target enrichment amount indicated by the line 126 and/or increase the slope of the gradual enrichment curve 124. This can reduce a likelihood of damage to the catalytic converter 110 by increasing the amount of enrichment supplied to the engine 108, and decreasing the air-to-fuel mixture ratio of the output of the engine 108. This is beneficial over conventional systems, which may have a stagnant or relatively stagnant target enrichment amounts.

Furthermore, if the temperature data indicates that a temperature of the catalytic converter 110 can be increased without being damaged from the reactions occurring within the catalytic converter 110, the control unit 114 can modify the enrichment map 118 to decrease the target enrichment amount indicated by the line 126 and/or decrease the slope of the gradual enrichment curve 124. This can reduce an amount of enrichment used by the automobile 100 by allowing a reduced amount of enrichment to be delivered to the engine 108.

Thus, the present invention can improve fuel efficiency of the automobile 100 and/or reduce emissions of the automobile 100. In addition, the present invention can reduce a likelihood that the catalytic converter 110 is damaged due, for example, to temperatures of the reactions occurring within the catalytic converter 110.

Figure 4:
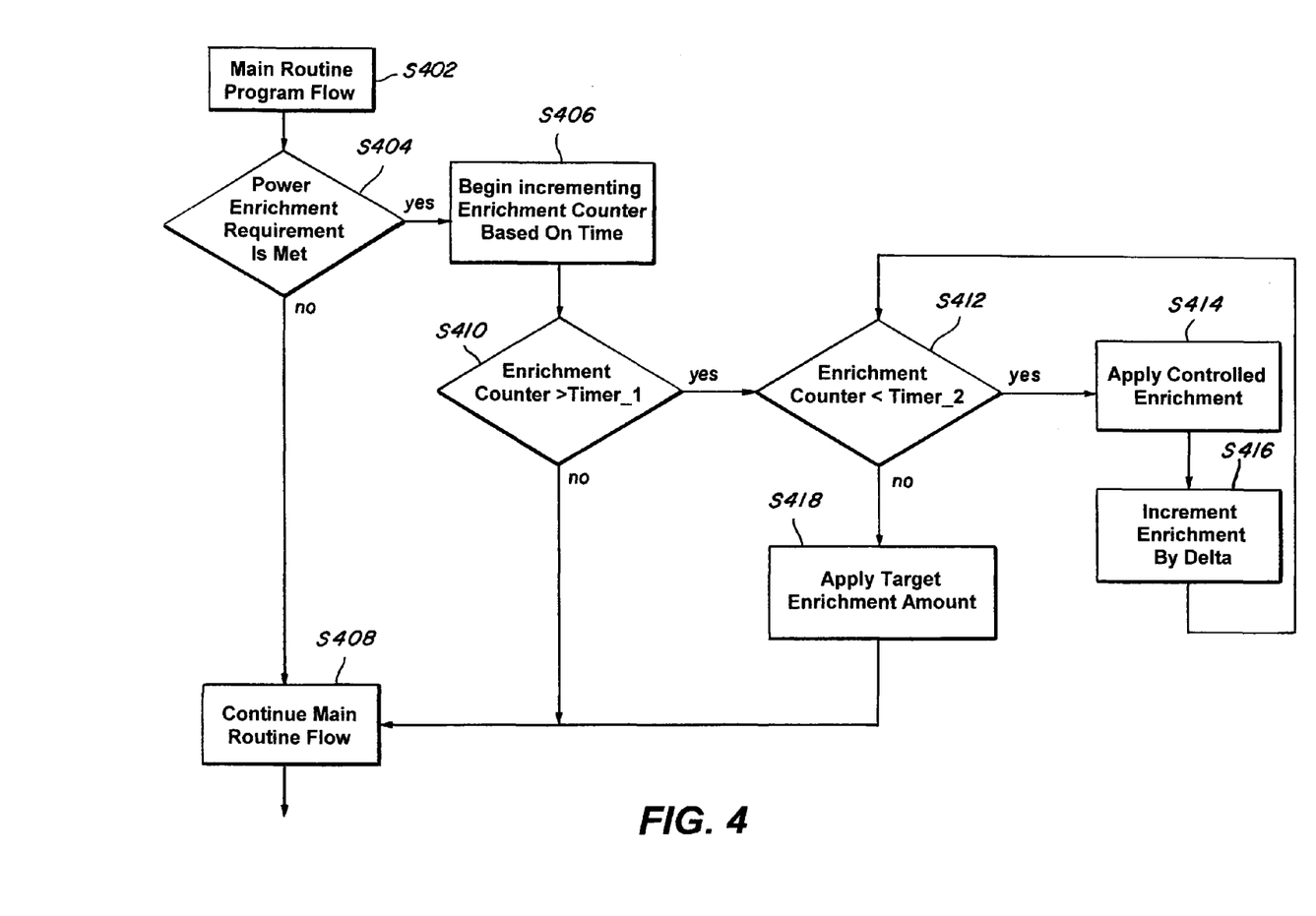
FIG. 4 depicts a process according to an embodiment of the present invention.

In one embodiment, the present invention is a process, such as that depicted in FIG. 4. In Step S402, a main routine program flow occurs. For example, the control unit 114 can control the enrichment delivery unit 104 to deliver a base fuel to the engine 108 by the enrichment delivery unit 104.

In Step S404, a determination is made as to whether a power enrichment requirement is met. For example, the control unit 114 can determine whether enrichment is necessary, such as when the temperature of the catalytic converter 110 is likely high enough to damage the catalytic converter 110. If the enrichment requirement is not met, then the process proceeds to Step S408 to continue to the main routine flow. For example, if the enrichment requirement is not met, the control unit 114 controls the enrichment delivery unit 104 to continue delivering the base fuel, but not the enrichment.

However, if the enrichment requirement is met, then the process proceeds to Step S406. In Step S406, the enrichment counter is incremented based on time. For example, the control unit 114 can maintain an enrichment counter and begin incrementing the enrichment counter at time T0 (FIG. 3). In Step S410, a determination is made as to whether the enrichment counter is greater than the time Timer_1. If the enrichment counter is not greater than Timer_1, then the process proceeds to Step S408. However, if the enrichment counter is greater than Timer_1 then the process proceeds to Step S412. In Step S412, a determination is made as to whether the enrichment counter is less than the time Timer_2. If the enrichment counter is greater than the time Timer_2, then the target enrichment amount is applied in Step S418. The process then proceeds to Step S408.

Otherwise, if the enrichment counter is not greater than the time Timer_2, then the process proceeds to Step S414. In Step S414, a controlled amount of enrichment is applied. For example, the control unit 114 can control the enrichment delivery unit 104 to deliver an enrichment amount less than the target enrichment amount to the engine 108. In Step S416, the amount of enrichment that will be delivered to the engine will be incremented by delta. For example, the control unit 114 can increase the amount of enrichment to be delivered to the engine 108 by the enrichment delivery unit 104 by delta. The delta can be a small or nominal amount such that the amount of enrichment delivered to the engine 110 is gradually increased. The process then proceeds back to Step S412.

Figure 5:
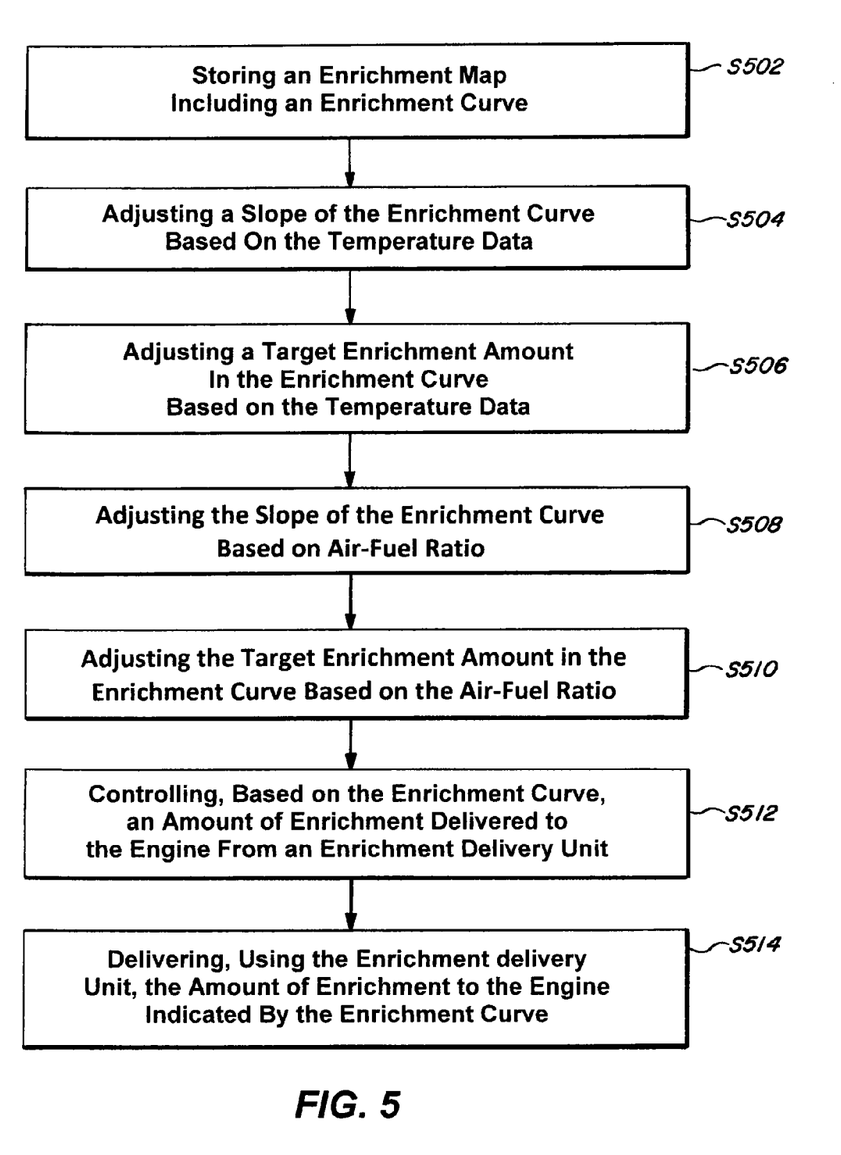
FIG. 5 depicts a process according to an embodiment of the present invention.

In another embodiment, the present invention is a process according to FIG. 5. In Step S502, an enrichment map including an enrichment curve is stored. For example, the enrichment map 118 can be stored in the memory 116. In Step S504, a slope of an enrichment curve is adjusted based on the temperature data. For example, the control unit 114 can analyze the temperature data from the sensor 120 and adjust a slope of the enrichment curve 134 in the enrichment map 118. In Step S506, a target enrichment amount in the enrichment curve is adjusted based on the temperature data. For example, the control unit 114 can analyze the temperature data from the sensor 120 and adjust the target enrichment amount 126 in the enrichment map 118.

In Step S508, a slope of the enrichment curve is adjusted based on the air-fuel sensor data. For example, the control unit 114 can analyze the air-fuel ratio from the sensor 106 and/or the sensor 112 to adjust a slope of the enrichment curve 134 in the enrichment map 118 based on the air-fuel ratio from the sensor 106 and/or the sensor 112. In Step S510, a slope of the target enrichment amount in the enrichment curve is adjusted based on the air-fuel sensor data. For example, the control unit 114 can analyze the air-fuel ratio from the sensor 106 and/or the sensor 112, and adjust the target enrichment amount 126 in the enrichment map 118.

In Step S512, an amount of enrichment delivered to the engine from the enrichment delivery unit is adjusted based on the enrichment curve. For example, the control unit 114 can control the enrichment delivery unit 104 to deliver an amount of enrichment corresponding to the enrichment curve 134 in the enrichment map 118. In Step S514, an amount of enrichment indicated by the enrichment curve is delivered using the enrichment delivery unit 104. For example, the enrichment delivery unit 104 can deliver the amount of enrichment indicated by the enrichment curve 134 in the enrichment map 118.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An enrichment delivery system comprising:
   an enrichment delivery unit configured to deliver enrichment to an engine;
   a memory configured to store enrichment data representing an enrichment curve that indicates a gradual increase in an amount of enrichment delivered to the engine and a target enrichment amount that optimizes fuel efficiency; and
   a control unit configured to increase, based on the enrichment curve, the amount of enrichment delivered to the engine from the enrichment delivery unit until the amount of enrichment delivered to the engine reaches the target enrichment amount.

2. The system of claim 1 wherein the control unit is further configured to adjust the target enrichment amount and a slope of the gradual increase in the amount of enrichment delivered to the engine based on an operation of the engine, and control the amount of enrichment delivered to the engine based on the adjusted slope of the gradual increase and the adjusted target enrichment amount.

3. The system of claim 1 further comprising a catalytic converter that receives an output of the engine, wherein the control unit is further configured to adjust the target enrichment amount and a slope of the gradual increase such that the amount of enrichment delivered to the engine optimizes fuel efficiency while reducing a likelihood of damage from chemical reactions within the catalytic converter during the gradual increase.

4. The system of claim 1 further comprising a temperature sensor configured to detect temperature data for a catalytic converter, and an air-fuel sensor configured to detect an air-fuel ratio, wherein the control unit is configured to adjust the enrichment curve based on the temperature data and the air-fuel ratio.

5. The system of claim 4 wherein the control unit adjusts a slope of the gradual increase in the amount of enrichment based on the temperature data.

6. The system of claim 5 wherein the control unit adjusts the target enrichment amount based on the temperature data.

7. The system of claim 1 further comprising an air-fuel sensor for detecting an air-fuel ratio, wherein the control unit adjusts the enrichment curve based on the air-fuel ratio.

8. The system of claim 7 wherein the control unit adjusts a slope of the gradual increase in the amount of enrichment based on the air-fuel ratio.

9. The system of claim 8 wherein the control unit adjusts the target enrichment amount based on the air-fuel ratio.

10. The system of claim 7 wherein the air fuel ratio corresponds to an output of an engine or an output of a catalytic converter.

11. An automobile comprising:
an engine configured to receive fuel and enrichment, and generate an output;
a catalytic converter receiving the output of the engine;
an enrichment delivery unit configured to initially deliver the enrichment to the engine;
a memory configured to store enrichment data representing an enrichment curve, wherein the enrichment curve indicates a gradual increase in an amount of enrichment delivered to the engine until a target enrichment time has been reached; and
a control unit configured to control, based on the enrichment curve, the amount of enrichment delivered to the engine from the enrichment delivery unit.

12. The automobile of claim 11 wherein the control unit is further configured to:
deliver, using the enrichment delivery unit, a base amount of fuel to the engine when an enrichment requirement is not met;
increment, using the control unit, an enrichment counter when the enrichment requirement is met; and
increase, using the control unit and the enrichment delivery unit, the amount of enrichment when the enrichment requirement is met and the enrichment counter is greater than a first timer but less than a second timer.

13. The automobile of claim 11 the control unit the target enrichment time is determined such that fuel efficiency of the automobile is optimized while reducing a likelihood of damage from chemical reactions within the catalytic converter during the gradual increase in the amount of enrichment.

14. The automobile of claim 11 further comprising a temperature sensor configured to detect temperature data of the catalytic converter and an air-fuel sensor, configured to detect an air-fuel ratio for an output of the engine or an output of the catalytic converter, wherein the control unit adjusts a slope of the enrichment curve based on the temperature data and the air-fuel ratio, and wherein the control unit adjusts the target enrichment amount based on the temperature data and the air-fuel ratio.

15. A method for initially delivering enrichment to an engine comprising:
storing, in a memory, enrichment data representing a graph that indicates a gradual increase in an amount of enrichment delivered to the engine until a target enrichment time has been reached; and
increasing, based on the graph, the amount of enrichment delivered to the engine from an enrichment delivery unit.

16. The method of claim 15 further comprising:
delivering, using the control unit and the enrichment delivery unit, a base amount of fuel to the engine when an enrichment requirement is not met;
incrementing, using the control unit, an enrichment counter when the enrichment requirement is met; and
increasing, using the control unit and the enrichment delivery unit, the amount of enrichment when the enrichment requirement is met and the enrichment counter is greater than a first timer but less than a second timer.

17. The method of claim 16 further comprising delivering, using the control unit and the enrichment delivery unit, a target enrichment amount to the engine when the enrichment requirement is met and the enrichment counter is greater than or equal to the second timer.

18. The method of claim 15 further comprising adjusting the target enrichment amount based on a sensed operation of the engine when the enrichment requirement is met and the enrichment counter is greater than or equal to the second timer.

19. The method of claim 16 further comprising adjusting a slope of the graph based on an air-fuel ratio.

20. The method of claim 19 further comprising adjusting the target enrichment amount based on the air-fuel ratio.

* * * * *